United States Patent

Ahmed

(10) Patent No.: US 9,862,238 B2
(45) Date of Patent: Jan. 9, 2018

(54) METHOD AND SYSTEM FOR INDICATING WEAR OF TYRE IN A VEHICLE AND A TYRE THEROF

(71) Applicant: Mumshad Faraz Ahmed, Bangalore (IN)

(72) Inventor: Mumshad Faraz Ahmed, Bangalore (IN)

( * ) Notice: Subject to any disclaimer, the term of this patent is extended or adjusted under 35 U.S.C. 154(b) by 26 days.

(21) Appl. No.: 14/783,394

(22) PCT Filed: Apr. 7, 2014

(86) PCT No.: PCT/IB2014/060482
§ 371 (c)(1),
(2) Date: Oct. 8, 2015

(87) PCT Pub. No.: WO2014/167478
PCT Pub. Date: Oct. 16, 2014

(65) Prior Publication Data
US 2016/0082781 A1    Mar. 24, 2016

(30) Foreign Application Priority Data
Apr. 9, 2013 (IN) .......................... 1620/CHE/2013

(51) Int. Cl.
*B60C 11/24* (2006.01)
*B60C 19/00* (2006.01)

(52) U.S. Cl.
CPC ............ *B60C 11/243* (2013.01); *B60C 11/24* (2013.01); *B60C 11/246* (2013.01); *B60C 2019/004* (2013.01)

(58) Field of Classification Search
CPC ..... B60C 11/24; B60C 11/243; B60C 11/246; B60C 2019/004
(Continued)

(56) References Cited

U.S. PATENT DOCUMENTS 3,770,040 A * 11/1973 De Cicco ................ B60C 11/24
116/208
4,226,274 A    10/1980 Awaya et al.
(Continued)

FOREIGN PATENT DOCUMENTS

JP    2005-028950 A    2/2005
JP    2005-186749 A    7/2005
(Continued)

OTHER PUBLICATIONS

Hatanaka (JP 4240414, Mar. 18, 2009, machine translation).*
(Continued)

*Primary Examiner* — Michael H. Wilson
*Assistant Examiner* — Sedef E Ayalp
(74) *Attorney, Agent, or Firm* — Harness, Dickey & Pierce, P.L.C.

(57) ABSTRACT

A tire of a vehicle is disclosed having at least one sensor, a control module and one or more indicators. The at least one sensor is located at a re-threading level of the tire to sense contact with ground surface. Upon contact with the ground surface, the at least one sensor generates data. The control module receives the data from the at least one sensor. Upon receiving the data, the control module determines a predefined condition. The control module transmits the data to a dashboard upon determining the predefined condition. The transmitted data is displayed on the dashboard which is communicatively connected to the control module for indicating wearing of the tire. In an embodiment, the dashboard provides signal relating to the displayed data. The one or more indicators is communicatively connected to the dashboard to receive signal relating to the data for indicating wearing of the tire.

7 Claims, 7 Drawing Sheets

(58) Field of Classification Search
USPC .................................. 152/154, 154.2; 73/146
See application file for complete search history.

(56) References Cited

U.S. PATENT DOCUMENTS

| | | | |
|---|---|---|---|
| 5,303,756 A | | 4/1994 | Hill |
| 5,917,408 A | * | 6/1999 | Cardillo .............. B60R 16/0231 340/309.7 |
| 6,970,074 B2 | * | 11/2005 | Perlman ................... B60Q 1/26 340/425.5 |
| 2003/0048178 A1 | * | 3/2003 | Bonardi ............. B60C 23/0416 340/442 |
| 2005/0280514 A1 | * | 12/2005 | Doan ..................... B60K 35/00 340/425.5 |
| 2007/0279203 A1 | * | 12/2007 | Thomas ................ B60C 23/068 340/447 |

FOREIGN PATENT DOCUMENTS

| | | | | |
|---|---|---|---|---|
| JP | 4240414 B1 | * | 3/2009 | ......... B60C 23/0406 |
| JP | 2009-292188 A | | 12/2009 | |

OTHER PUBLICATIONS

Paul Frame, Radioluminescent Paint, Oct. 18, 2007, Oak Ridge Associated Universities, p. 1.*
Ryosuke Matsuzaki, Wireless Monitoring of Automobile Tires for Intelligent Tires, 2008, Sensors, vol. 8, pp. 8123-8138.*
The Fiber Optic Association, Fiber Optic Lighting, Dec. 9, 2008, pp. 1-8.*
McGraw-Hill Dictionary of Scientific & Technical Terms, "Control Module" Definition, 2003, The McGraw-Hill Companies, Inc., 6th Ed.*
International Search Report for PCT/IB2014/060482 (in English), dated Jul. 2, 2014; ISA/EP.
Written Opinion of the IPEA PCT/IB2014/060482, IPEA/EP, Munich, dated Mar. 5, 2015.

* cited by examiner

METHOD AND SYSTEM FOR INDICATING WEAR OF TYRE IN A VEHICLE AND A TYRE THEROF

CROSS-REFERENCE TO RELATED APPLICATION

The present application claims priority to Indian patent application serial number 1620/CHE/2013 filed on Apr. 9, 2013, the entire contents of which are incorporated by reference.

TECHNICAL FIELD

The present disclosure relates to a wearing of tyres of a vehicle. An embodiment of the instant disclosure discloses methods and system for indicating wearing of tyre in the vehicle.

BACKGROUND OF THE DISCLOSURE

A tyre (also spelled as tire) is a ring-shaped covering which fits around a rim of a wheel of a vehicle. The tyre protects the wheel and enables better vehicle performance. Also, tyres provide traction between the vehicle and the road surface along with providing a flexible cushion which absorbs shock. Modern pneumatic tyres are made up of synthetic rubber, natural rubber, fabric and wire, along with carbon black and other chemical compounds. Usually, the tyres consist of a thread and a body. The thread is the part of the tyre which comes in contact with the road surface. Also, the thread provides grip with the road surface. Generally, the tyre with a thick rubber or rubber/composite compound formulated provides an appropriate level of traction and does not wear away too quickly. However, the tyres gradually wear down over the course of continuous usage. Also, the tyres wear down due to aggressive driving, or steering and alignment problems. Usually, the threads of tyres are gradually worn out since the threads are in contact with road surface. The wearing of threads of the tyres result in baldness of tyre and hence the tyre is termed as bald tyre.

Bald tyres are dangerous because limited thread reduces traction for the vehicle, which can be very dangerous in wet or icy driving conditions. Further, bald tyres results in tyre blowouts. Baldness of tyres results in fatal consequences leading to injury and casualty for both the driver or rider and living beings in the vicinity of the vehicle since baldness results in slithering of the vehicle. Ideally, tyres are required to be replaced before the tyre is truly bald. The driver is required to check the tyres often to ensure that the tyre thread depth is safe. Usually, tyres are usable until the tyre thread depth reaches $1/16$ of an inch (0.15 centimeters). Such depth of the tyre is termed as the "re-threading level of the tyre".

In conventional systems, penny test is a common method to assess tyre safety i.e. to check the depth of the threads. Penny test is a manual method, where a coin is inserted between the threads of the tyre. If the coin doesn't go enough inside the threads, then the tyre has to be replaced. However, penny test is not a reliable method for testing the tyre life since each time the driver needs to place the coin to check the thread depth which is a manual method. Conventionally, a number of wear indicators are embedded at a predetermined location of the threads. Upon wearing of the tyre, the wear indicators become visible. The indicators provide an indication for tyre replacement upon wearing of the tyre.

U.S. Pat. No. 5,303,756 discloses a visually distinctive material embedded in the tyre that gets exposed when threads wear down. Further, U.S. Pat. No. 4,226,274 provides for a wear indicator which is in the form of a letter 'K'. The indicator is embedded in the thread provides a quantitative measure of the amount of thread remaining from being worn out. Additionally, the wear indicator provides visual signals when the tyre is worn out. However, the conventional methods do not provide indication to the driver on wearing of the tyre before wearing of the tyre takes place.

In one conventional method, the wear of tyre is detected based on number of rotations of the tyre. Particularly, upon reaching a desired number of rotations of the tyre, the wear of tyre is indicated. However, such a way of indication involves huge processing power and time where the number of rotations needs to be calculated at regular intervals of time.

In one conventional method, tyres i.e. sidewalls are illuminated using optical fibres to indicate visibility of the moving vehicle on roads. However, such a way of illumination does not imply the wear of tyre.

Hence, there is a need for a method for detecting and indicating the baldness of the tyre when rethreading level is reached.

SUMMARY

The shortcomings of the prior art are overcome through the provision of a method, an apparatus and a system as described in the description.

The present disclosure discloses a method for indicating wearing of tyre in a vehicle. The method comprises sensing contact of at least one sensor with ground surface by the at least one sensor which is located at a re-threading level of the tyre. The at least one sensor generates data upon contact with the ground surface. The data generated by the at least one sensor is received by a control module through one or more connectors. Upon receiving the data from the at least one sensor, the control module determines a predefined condition. The control module is configured on the tyre. Upon determining the predefined condition, the control module transmits the data to a dashboard of the vehicle which is communicatively connected to the control module. The data is displayed on the dashboard for indicating wear of the tyre. Then, signal relating to the displayed data is transmitted by the dashboard to one or more indicators for indicating wear of the tyre. The one or more indicators are communicatively connected to the dashboard. In an embodiment, the method includes display the data on a display unit configured on the tyre indicating wear of the tyre where the data is received from the control module.

The present disclosure discloses a system for indicating wearing of tyre in a vehicle. The system comprises at least one sensor, a control module, a dashboard and one or more indicators. The at least one sensor is located at a rethreading level of the tyre. The at least one sensor is used to sense contact of the at least one sensor with ground surface. The at least one sensor generates data upon contact with the ground surface. The control module is configured on the tyre. The control module receives the data from the at least one sensor through one or more connectors. Upon receiving the data, the control module determines a predefined condition and transmits the data upon determining the predefined condition. The dashboard is communicatively connected to the control module to receive the data. The data received from the control module is displayed on the dashboard for indicating wear of tyre. The one or more indicators are configured on the tyre and are communicatively connected to the dashboard. The one or more indicators receives signal relating to the displayed data from the dashboard for indicating wear of the tyre. In an embodiment, the system includes a display unit configured on the tyre to display the data indicating wear of the tyre where the data is received from the control module.

A tyre of a vehicle is disclosed in the present disclosure. The tyre comprises at least one sensor, a control module and one or more indicators. The at least one sensor is located at a re-threading level of the tyre to sense contact with ground surface. Upon contact with the ground surface, the at least one sensor generates data. The control module receives the data from the at least one sensor through one or more connectors. Upon receiving the data, the control module determines a predefined condition. The control module transmits the data to a dashboard upon determining the predefined condition. The transmitted data is displayed on the dashboard which is communicatively connected to the control module for indicating wear of the tyre. In an embodiment, the dashboard provides signal relating to the displayed data. The one or more indicators is communicatively connected to the dashboard to receive signal relating to the data for indicating wear of the tyre. In an embodiment, the tyre includes a display unit to display the data indicating wear of the tyre where the data is received from the control module.

The present disclosure discloses a method for indicating wearing of tyre in a vehicle. The method comprises sensing contact of at least one sensor with ground surface by the at least one sensor located at a re-threading level of the tyre. The at least one sensor generates data is upon contact with the ground surface. The data generated is received by a control module through one or more connectors. The received data is stored in a storage unit of the control module. The control module transmits signal relating to the received data to one or more indicators configured on the tyre for indicating wear of the tyre. In an embodiment, the method includes display the data on a display unit configured on the tyre indicating wear of the tyre where the data is received from the control module.

A tyre of a vehicle is disclosed in the present disclosure. The tyre comprises at least one sensor, a control module and one or more indicators. The at least one sensor is located at a re-threading level of the tyre to sense contact with ground surface. The at least one sensor generates data upon contact with the ground surface. The control module receives the data from the at least one sensor through one or more connectors. The received data is stored in a storage unit of the control module. The one or more indicators receives signal relating to the data from the control module for indicating wear of the tyre. In an embodiment, the tyre includes a display unit to display the data indicating wear of the tyre where the data is received from the control module.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The features of the present disclosure are set forth with particularity in the appended claims. The disclosure itself, together with further features and attended advantages, will become apparent from consideration of the following detailed description, taken in conjunction with the accompanying drawings. One or more embodiments of the present disclosure are now described, by way of example only, with reference to the accompanied drawings wherein like reference numerals represent like elements and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The present disclosure discloses method, system and tyre thereof for indicating wear of tyre in a vehicle. The method and system includes sensors, connectors, a control module, indicators, a display unit in the tyre and a dashboard at driver's place. The sensors are placed at a predetermined level of threads of the tyre. The sensors generates data when comes in contact with ground surface. The data generated is transmitted to the control module. The control module determines a predefined condition which includes whether data is continuously received for predetermined amount of distance. If the predefined condition is determined, then the control module transmits the data to the dashboard which displays the data for indicating the wear of the tyre. The dashboard in turn transmits signal relating to the displayed data to the indicators to indicate the wear of the tyre. In an embodiment, the control module transmits the data directly to the indicators and the display unit respectively, to indicate the wear of the tyre.

Figure 1A:
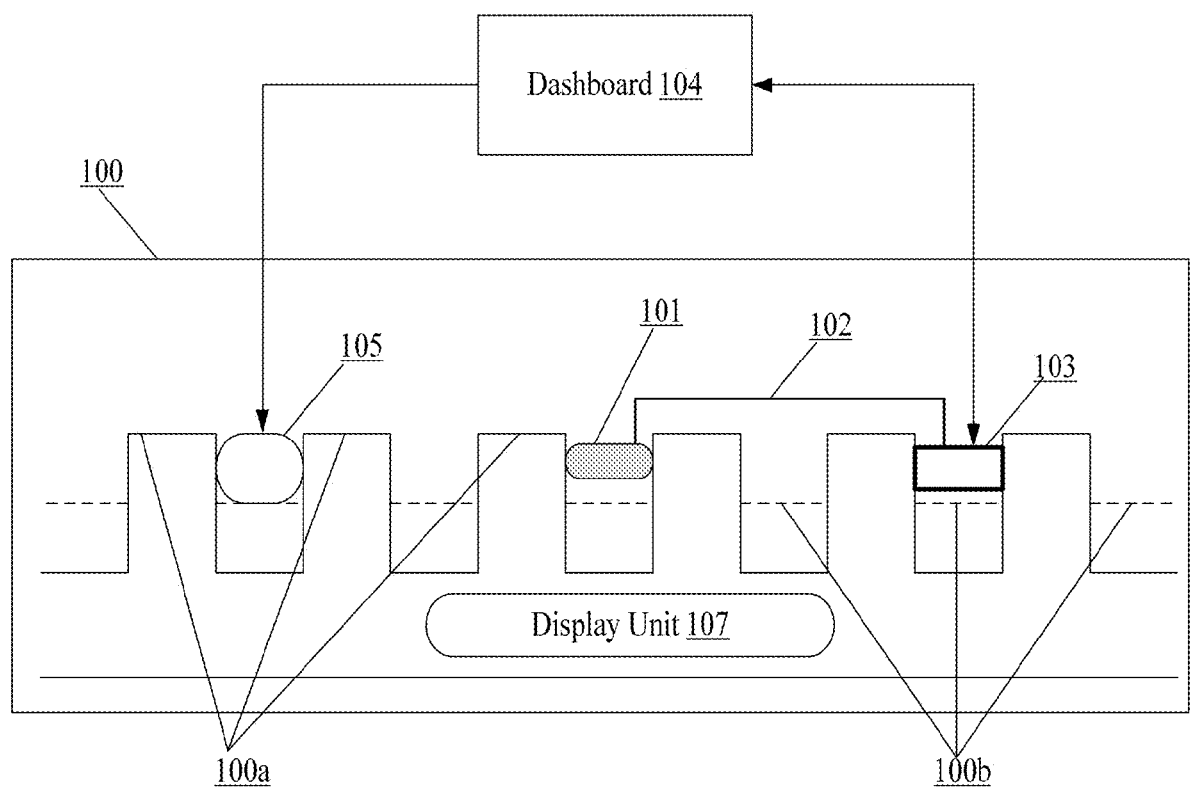
FIG. 1A illustrates a schematic view of a system for indicating wear of tyre in a vehicle in accordance with an embodiment of the present disclosure.

FIG. 1A illustrates a schematic view of a system for indicating wear of tyre 100 in a vehicle in accordance with an embodiment of the present disclosure. The system comprises a tyre 100 and a dashboard 104 of the vehicle. The tyre 100 consists of threads referred by numeral 100a. Usually, wear out of the tyre 100 is determined when a wear out of threads have reached below a cut off level called as rethreading level referred to as 100b. For example, considering the depth of the threads is 50 millimeter (mm) and a rethreading level defined to be 5 mm of the thread depth. If the tyre threads wear out to 5 mm then wear out condition of the tyre is determined. The tyre 100 comprises at least one sensor 101, one or more connectors 102, a control module 103 and one or more indicators 105. The at least one sensor 101 is located at the rethreading level 100b. In an embodiment, the at least one sensor is located at a predefined location, for example, 2 mm to 3 mm above the rethreading level 100b. The at least one sensor 101 is used to sense contact with ground surface which is resulted when the wear out of tyre 100 is near to the rethreading level 100b. The at least one sensor 101 generates data upon contact with the ground surface. The at least one sensor 101 includes, but does not limit to, touch sensor filament or a thin sensor filament, highly thin metal sheets, highly thin optical fibre sensor and light emitting indicators. The touch sensor filament is made of silicon or plastic with thickness in the range from 1 mm to 4 mm. In an embodiment, the touch sensor filament has the thickness between 1.8 mm and 2.8 mm. The highly thin metal sheets generate friction when comes in contact with road surface and which produces signals thereby. The highly thin metal sheets have thickness between 0.05 mm and 1.5 mm. In an embodiment, the thickness of the metal sheets has thickness between 0.1 mm and 0.9 mm. The highly thin optical fibre sensor has the thin coating which is rubbed off upon contact with the road surface. The thickness of the optical fibre sensor is in the range of 0.05 mm to 2 mm. In an embodiment, the thickness of the optical fibre sensor is between 0.1 mm and 0.6 mm. The light emitting indicators is radium coated plastic having thickness between 0.3 mm and 1.0 mm. The light emitting indicators is exposed when the tyre 100 wear out and thereby produces luminescence. The luminescence in turn is captured as signals which are transmitted to the dashboard 104 for indicating wear out of the tyre 100.

In an embodiment, the at least one sensor 101 includes, but does not limit to, pressure sensors, temperature sensors, gyro sensors, force sensors, resistive sensors, capacitive touch sensors. The pressure sensors provide an array of force sensitive cells that measure the pressure distribution between virtually any mating and contacting surface. Particularly, the pressure sensors measures the pressure exerted on the tyre 100. In an embodiment, a cut off pressure is pre-set. When the pressure of the tyre is beyond the cut off pressure then the pressure sensors generate data. The temperature sensors measure temperature of the tyre 100. In an embodiment, a cut off temperature is pre-set. There exists two ways where the temperature reaches the cut off temperature. First way when the when the tyre rubber is heated due to extensive tyre running and second way when the tyre rubber is heated/cooled due to external weather condition. Therefore, when the temperature is beyond the cut off temperature, then the temperature sensors generate data. The gyro sensors measures thread orientation of the tyre 100. Thread orientation is predefined for the tyre 100. Therefore, when the change in orientation or change in alignment is measured by the gyro sensors, data is generated. The force sensors are used for force measurement. The force sensors are ultra-thin and flexible printed circuits which may be integrated into force measurement applications. The force sensors measure a relative change in force or applied load due to contact or touch with the ground surface. In an embodiment, a force threshold is set.

Therefore, when rate of change in force threshold is determined, the data is generated. The capacitive touch sensors transfer energy within an electrical network by means of the capacitance between circuit nodes. The capacitive touch sensors are placed in series with the signal to be coupled. The resistive sensors are versatile and robust which are used for distance and pressure application by using physical contact between two materials to generate a variable resistance.

The data generated by the at least one sensor 101 is received by the control module 103 through the one or more connectors 102. The one or more connectors 102 include, but are not limited to, ultra-thin optical fibre connectors and ultra-thin optical fibre which transmit data. The one or more connectors 102 have thickness between 0.05 mm to 2 mm. The control module 103 uses one or more network interfaces (not shown in FIG. 1A) including, but not limiting to, fibre media converter also known as fibre transceivers, Ethernet media converters supporting different data communication protocols including Ethernet, Fast Ethernet, Gigabit Ethernet, T1/E1/J1, twisted pair, multi-mode and single-mode fibre optics. The network interfaces enables connecting two dissimilar media types such as twisted pair with fibre optic cabling. In an embodiment, the control module 103 includes small-factor pluggable (SFP) transceiver. Upon receiving the data from the at least one sensor 101, the control module 103 determines a predefined condition. In an embodiment, the predefined condition is determined by retrieving a current meter usage distance from the dashboard 104 of the vehicle which is communicatively connected to the control module 103. In an embodiment, the control module 103 is connected to the dashboard 104 using one of the medium including, but not limiting to, wireless or remote. After retrieving the current meter usage distance, the control module 103 evaluates whether the data from the at least one sensor 101 is received for a predetermined amount of distance with respect to the current meter usage distance. For example, data is received from the at least one sensor 101 and same time the control module 103 receives the current meter usage distance as 30 kms from the dashboard 104. Then, the control module 103 checks whether the data is continuously received, in one embodiment periodically, for the predetermined distance, for example, for next 30 kms. If the receiving of the data for the predetermined amount of distance is evaluated i.e. for next 30 kms, then the control module 103 transmits the data to the dashboard 104. If receiving of the data for the predetermined amount of distance is not evaluated, then it is determined that the at least one sensor 101 is in contact with the ground surface due puncture of the tyre 100. The tyre puncture is due to external element including, but not limiting to, nail, metal rod, piece of sharp stone etc. The punctured tyre usually does not run more than 5 to 10 kms; therefore, the receiving of data for the predetermined amount of distance is not evaluated.

The dashboard 104 receives the data transmitted by the control module 103. The dashboard 104 is present near the driver's seat and includes a transceiver and a communicator. The transceiver of the dashboard 104 is responsible for transmitting and receiving of the data to and from the control module 103 respectively. The communicator of the dashboard 104 is used to display the data received from the control module 103 for indicating the wear of the tyre 100. In an embodiment, the dashboard 104 is communicatively connected to the one or more indicators 105. The one or more indicators 105 receives signal relating to the data displayed on the dashboard 104 for indicating wear of the tyre 100.

Figure 1B:
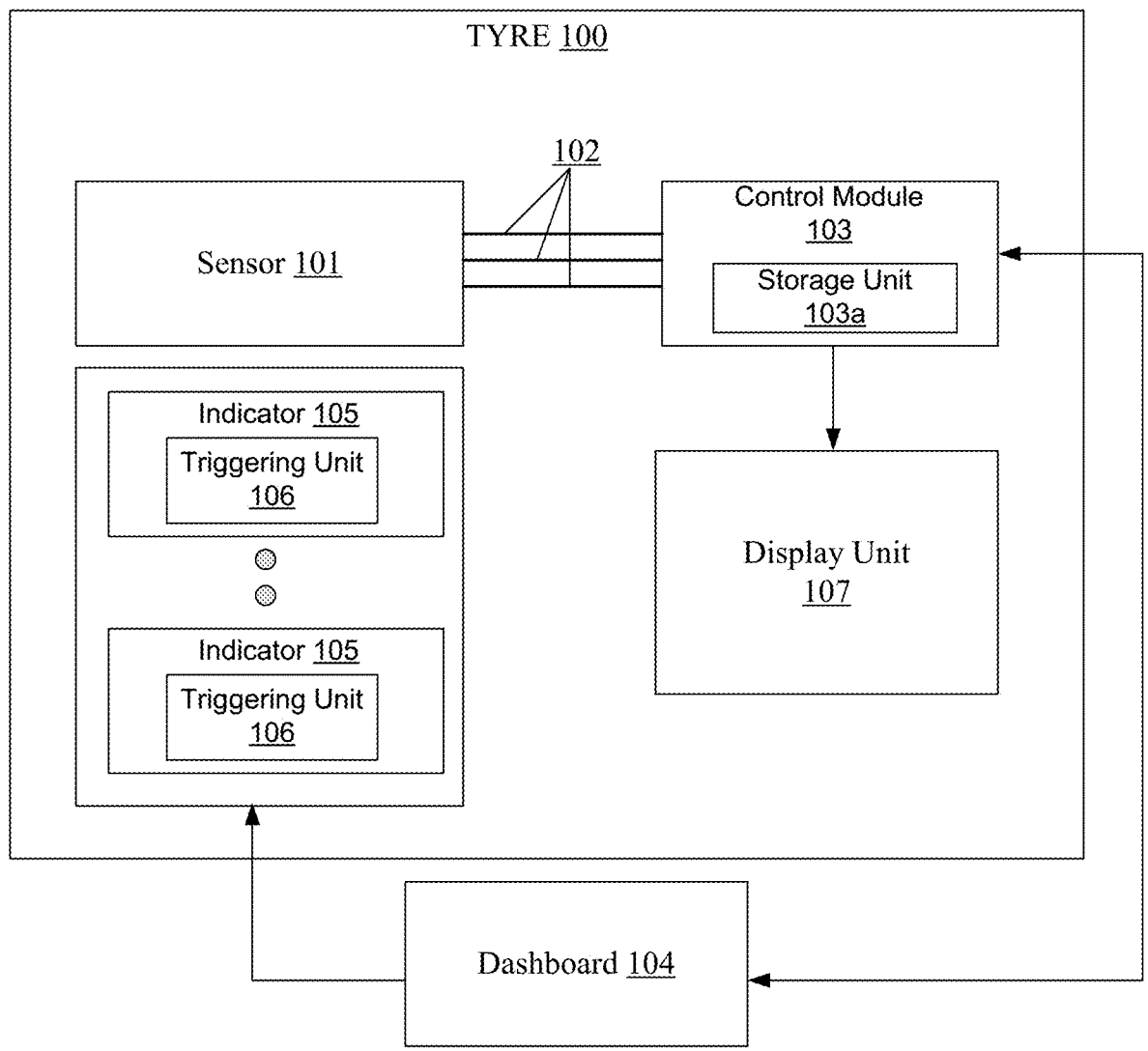
FIG. 1B illustrates a block diagram of an exemplary system for indicating wear of tyre in a vehicle in accordance with an embodiment of the present disclosure.

FIG. 1B illustrates a block diagram of an exemplary system for indicating wear of tyre 100 in the vehicle in accordance with an embodiment of the present disclosure. The system comprises the components explained in FIG. 1A. In an embodiment, the data received from the at least one sensor 101 is stored in a storage unit 103a of the control module 103. The storage unit of the control module 103 may be an ultra-thin silicon chip with thickness between 3.0 mm to 6.0 mm. In an embodiment, silicon chip may have an International Mobile Equipment Identity (IMEI) number or a unique identity to identity that particular vehicle.

The one or more indicators 105 is battery operated. The one or more indicators 105 include a triggering unit 106 for triggering a light source of the one or more indicators 105 upon receiving signal from the dashboard 104. The light source transmits the light in an optical fibre. Particularly, the light source transmits light into optical fibres which are placed around the tyre 100. In an embodiment, the optical fibres flash lights of the one or more indicators 105 for indicating wear of the tyre 100. These optical fibres have lights on their fibre tips and are placed very close to each other in a straight line. For these tiny lights to glow and be visible from a distance i.e., vehicles coming behind and vehicles coming in opposite direction at a distance of at least, for example 500-1000 meters so that the vehicle behind and coming in opposite direction immediately is notified of this vehicle that tyre having reached rethreading level and needs to be maintained a distance. These fibres have to be placed very close so that they collectively emit light and be visible from even at a distance. This makes living beings in the vicinity to take precaution of the bald tyres of the vehicle.

In an embodiment, the control module 103 directly sends the data to a display unit 107 configured on the tyre 100. More particularly, the control module 103 sends the data to the display unit 107 for indicating wear of the tyre 100 when the data from the at least one sensor 101 is received by the control module 103. In this situation, the predefined condition is not determined and hence the communication with the dashboard 104 is not required. In an embodiment, a timer may be embedded in the control module 103 for evaluating the receiving of the data for a predetermined amount of time upon receiving the data. The control module 103 transmits the data upon evaluating the receiving of the data for the predetermined amount of time.

Figure 1C:
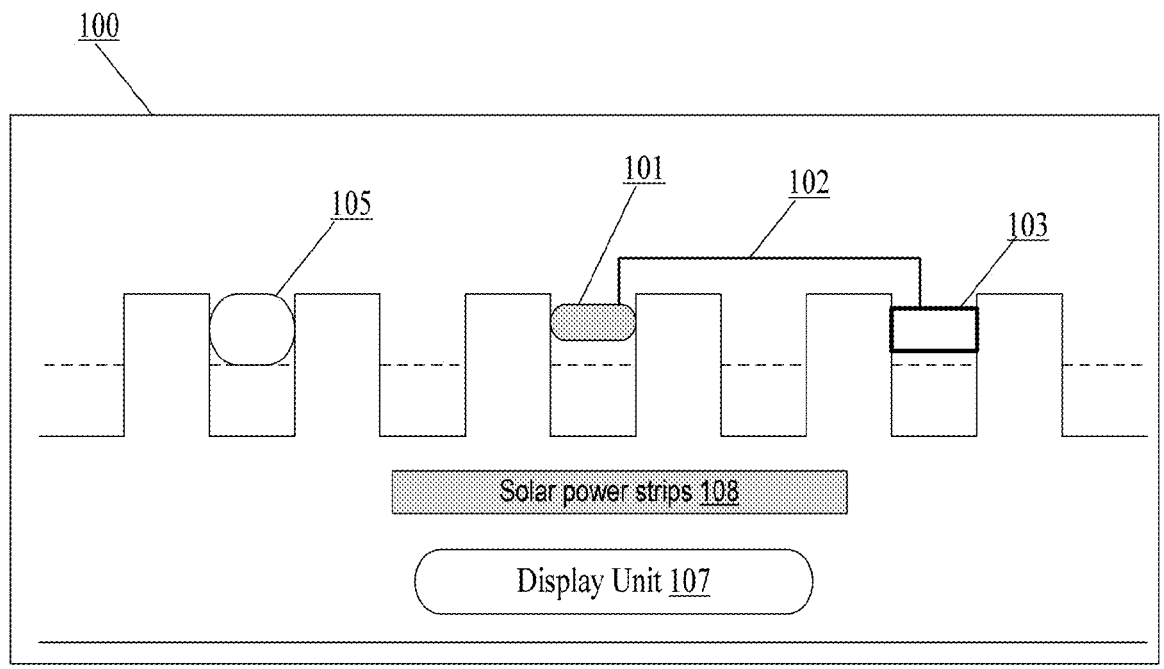
FIG. 1C illustrates solar power strips embedded on a tyre to provide power to a control module in accordance with an embodiment of the present disclosure.

FIG. 1C illustrates solar power strips 108 embedded on the tyre 100 to provide power to the control module 103 in accordance with an embodiment of the present disclosure. The solar power strips 108 are embedded on the walls or body of the tyre 100. In an embodiment, the control module 103 is battery operated which is discharged after a certain period. Hence, the present disclosure uses solar power strips 108 as power supplier. The function of solar power strips 108 is controlled by control module 108 so as to allow the power supply to switch on/off and use the power. The solar power strips 108 acts as a backup of power supply when in-built battery of the control module 103 fails which helps in battery consumption. The solar power strips 108 are connected to the control module 103 through the one or more connectors 102.

Figure 2:
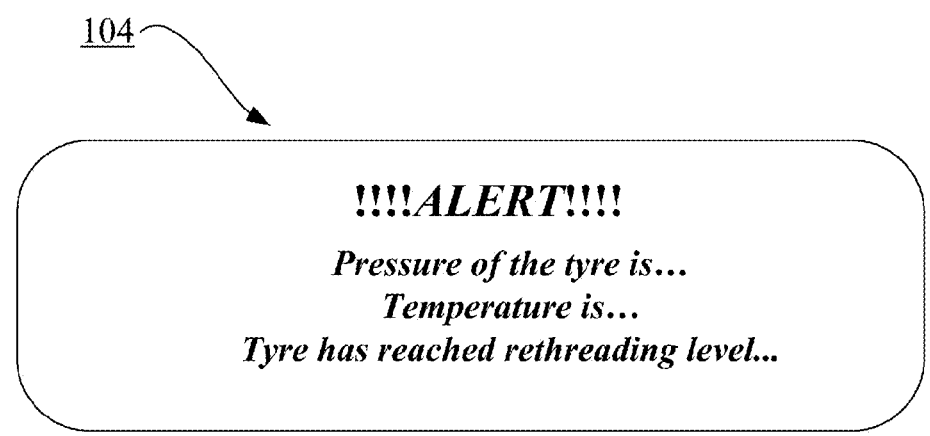
FIG. 2 shows an exemplary dashboard indicating wear of tyre in accordance with an embodiment of the present disclosure.

FIG. 2 shows an exemplary dashboard 104 indicating wear of tyre 100 in accordance with an embodiment of the present disclosure. The dashboard 104 alerts the driver in relation to wear out of the tyre 100. The dashboard 104 alerts the driver to replace the tyre with new tyre. For example, in the illustrated FIG. 2, the dashboard 104 displays the alert stating that the tyre has reached the rethreading level and needs to be replaced. In an embodiment, the medium or data link between the control module 103 and the dashboard 104 is such that the control module 103 transmits the data to the dashboard 104 of the same vehicle and not to other vehicle which are parked or passing by.

Figure 3:
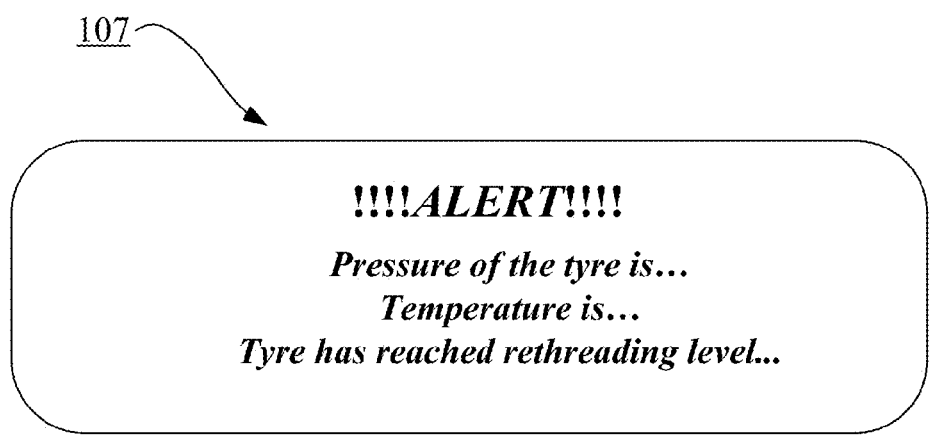
FIG. 3 shows an exemplary display unit indicating wear of tyre in accordance with an embodiment of the present disclosure.

FIG. 3 shows an exemplary display unit 107 indicating wear of tyre 100 in accordance with an embodiment of the present disclosure. The display unit 107 alerts the driver in relation to wear out of the tyre 100. The display unit 107 alerts the driver to replace the tyre with new tyre. For example, in the illustrated FIG. 3, the display unit 107 displays the alert in relation to pressure of the tyre, temperature of the tyre, thread orientation.

Figure 4A:
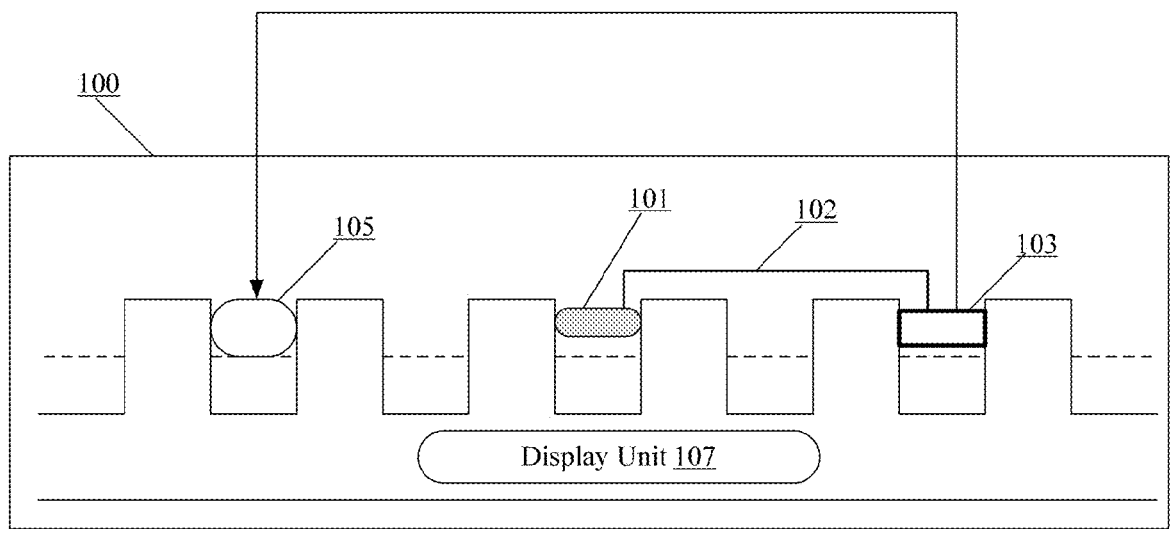
FIG. 4A illustrates a schematic view of a system for indicating wear of tyre in one or more indicators and a display unit of the tyre in accordance with an embodiment of the present disclosure.
Figure 4B:
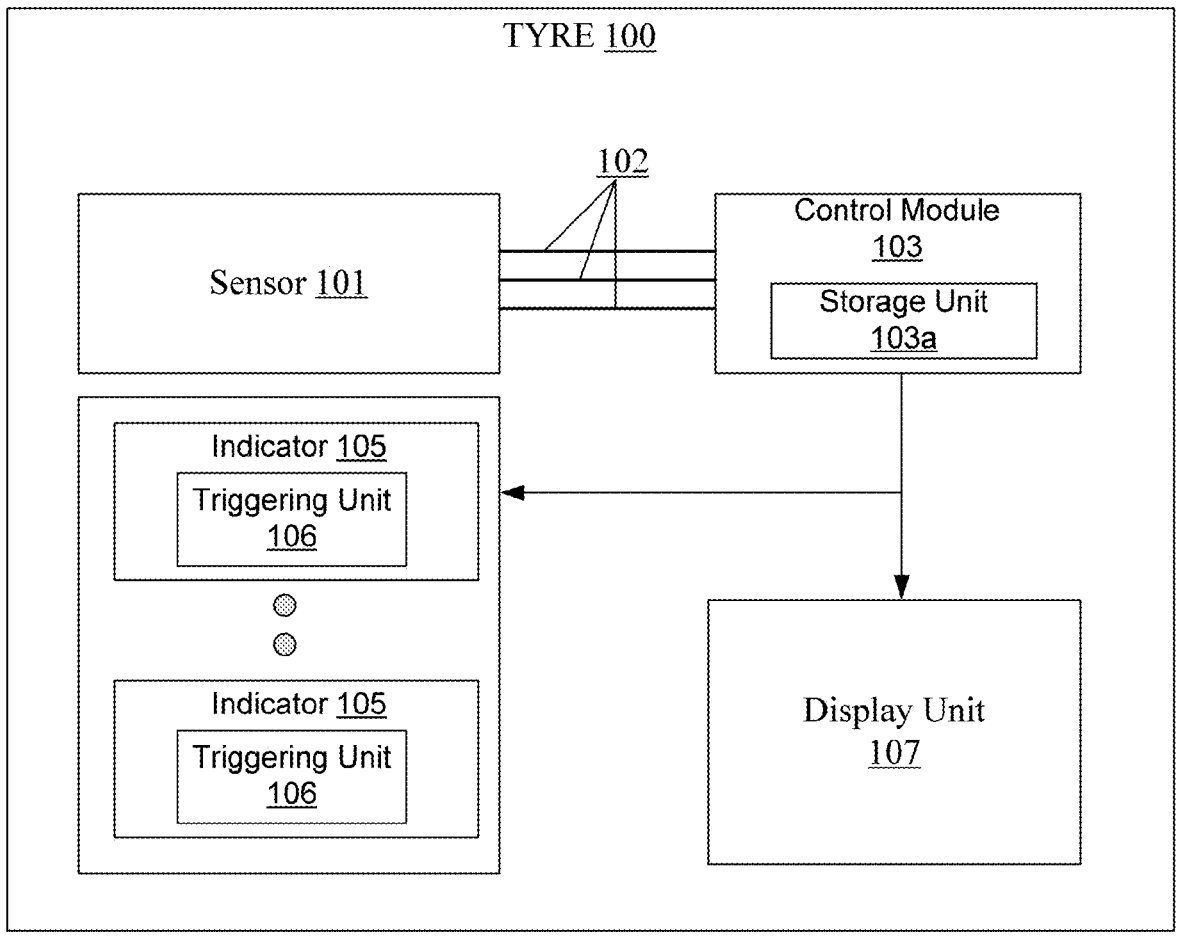
FIG. 4B illustrates a block diagram of a system for indicating wear of tyre in one or more indicators and a display unit of the tyre in accordance with an embodiment of the present disclosure.

FIGS. 4A and 4B illustrates a schematic view and block diagram of a system for indicating wear of tyre 100 in the one or more indicators 105 and the display unit 107 of the tyre 100 in accordance with an embodiment of the present disclosure. In the illustrated FIGS. 4A and 4B, the control module 103 is communicatively connected to the one or more indicators 105. The control module 103 transmits the data to the one or more indicators 105 when the control module 103 receives the data from the at least one sensor 101. Further, the control module 103 transmits the data to the display unit 107 for indicating wear of the tyre 100.

Figure 5:
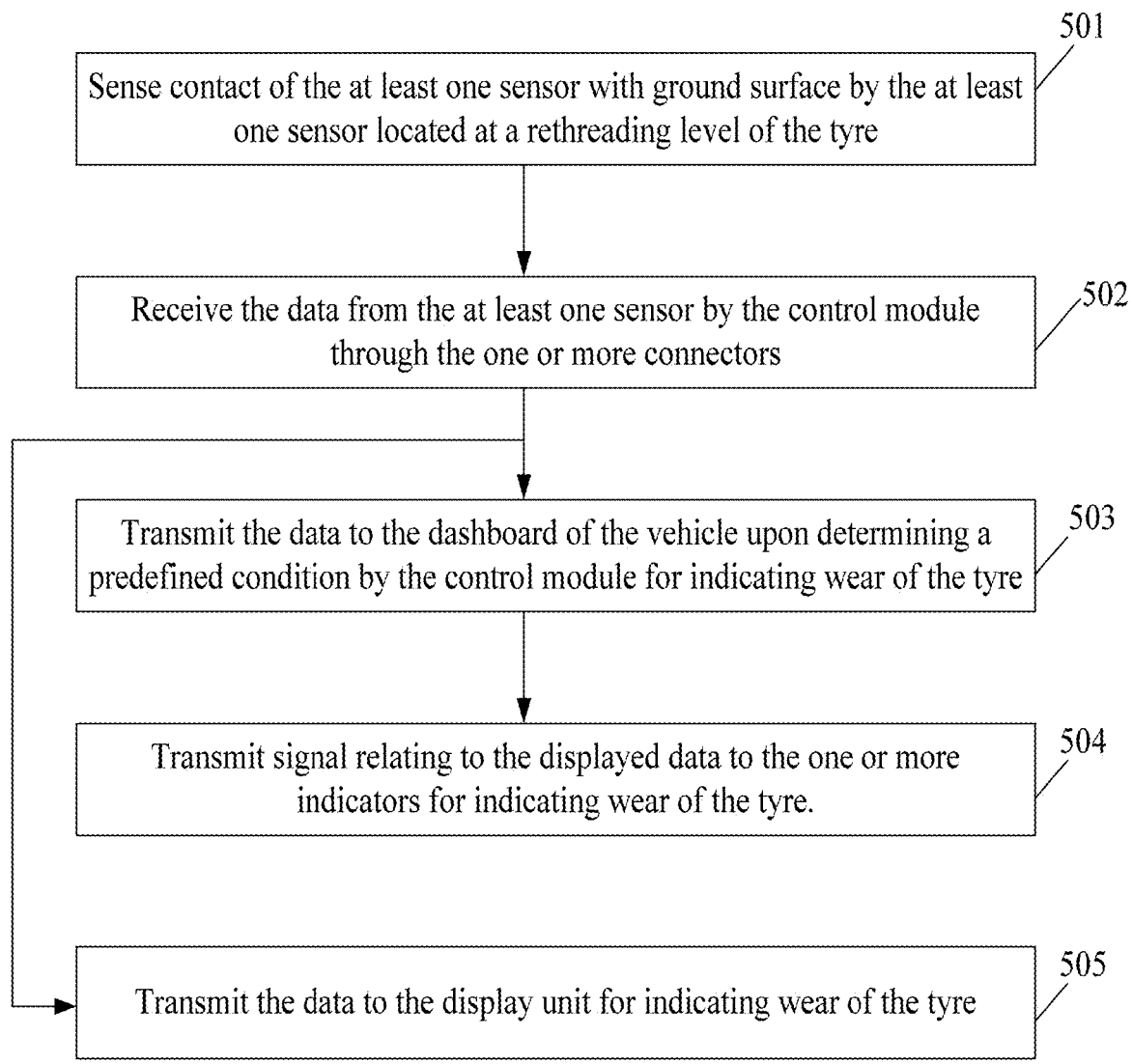
FIG. 5 shows a flowchart illustrating a method for indicating wear of tyre on a dashboard and one or more indicators in accordance with an embodiment of the present disclosure.

FIG. 5 shows a flowchart illustrating a method for indicating wear of tyre 100 on the dashboard 104 and the one or more indicators 105 in accordance with an embodiment of the present disclosure. At step 501, the at least one sensor 101 which is placed at a rethreading level, senses contact with ground surface. Upon contact with the ground surface, the at least one sensor 101 generates data. At step 502, the data generated by the at least one sensor 101 is received by the control module 103 through the one or more connectors 102. Upon receiving the data, the control module 103 determines a predefined condition. The control module 103 determines the predefined condition by retrieving a current meter usage distance from the dashboard 104 of the vehicle. As an example, ECU provides this information. Then, the control module 103 evaluates whether the data from the at least one sensor 101 is received for a predetermined amount of distance with respect to the current meter usage distance. The control module 103 transmits the data to the dashboard 104 after evaluating receiving of the data for the predetermined amount of distance. At step 503, the control module 103 transmits the data to the dashboard 104 of the vehicle upon determining the predefined condition. In one embodiment the data is displayed on the dashboard 104 for indicating wearing of tyre. Then, at step 504, the dashboard 104 transmits signal relating to the displayed data to the one or more indicators 105 configured on the tyre for indicating wearing of the tyre. In an embodiment, the control module 103 transmits the data to the display unit 107 for displaying data indicating the wear of tyre 100 as illustrated at step 505.

Figure 6:
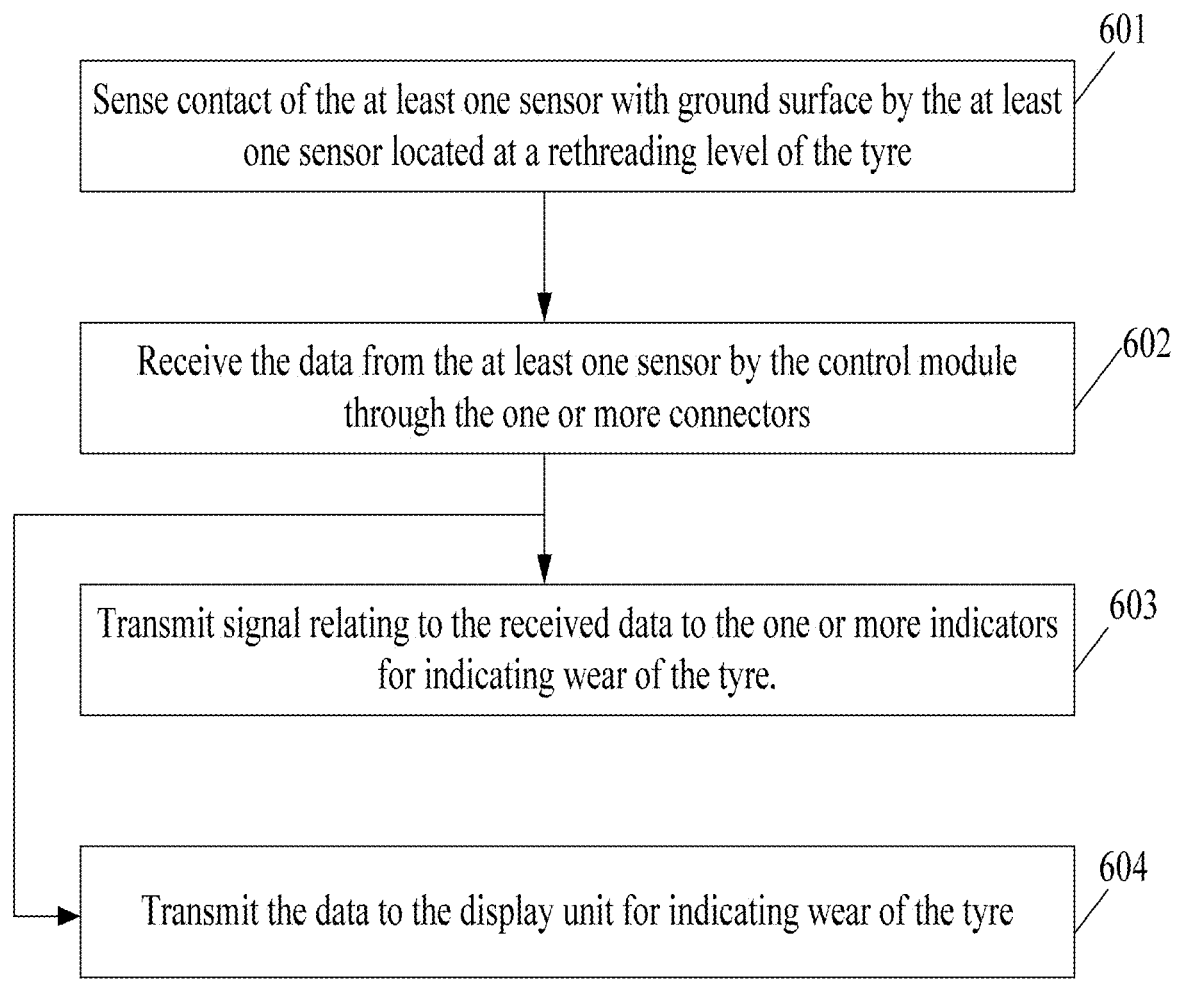
FIG. 6 shows a flowchart illustrating a method for indicating wear of tyre in one or more indicators in accordance with an embodiment of the present disclosure.

FIG. 6 shows a flowchart illustrating a method for indicating wear of tyre 100 in the one or more indicators 105 in accordance with an embodiment of the present disclosure. At step 601, the at least one sensor 101 which is placed at a rethreading level, senses contact with ground surface. Upon contact with the ground surface, the at least one sensor 101 generates data. At step 602, the data generated by the at least one sensor 101 is received by the control module 103 through the one or more connectors 102. At step 603, the control module 103 transmits signal relating to the received data to the one or more indicators 105 configured on the tyre 100 for indicating wearing of the tyre 100. In an embodiment, the control module 103 transmits the data to the display unit 107 for displaying data indicating the wear of tyre 100 as illustrated at step 604. In one embodiment the control module 103 determines a predefined condition before transmitting signal to the one or more indicators 105 configured on the tyre 100 for indicating wear of the tyre 100.

Advantages of the present disclosure are illustrated herein.

Embodiment provides an alert for the driver of the rethreading level of tyre. Alert is provided on the dashboard, display unit and the one or more indicators so that vehicles coming behind or in the opposite direction and to all other living beings in the vicinity to take note and keep distance from a possible accident, slide or any such harm.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Reference Table | |
| --- | --- |
| Reference Numerals | Description |
| 100 | Tyre |
| 100a | Threads |
| 100b | Rethreading level |
| 101 | Sensor |
| 102 | Connectors |
| 103 | Control Module |
| 103a | Storage Unit |
| 104 | Dashboard |
| 105 | Indicators |
| 106 | Triggering Unit |
| 107 | Display Unit |
| 108 | Solar Strips |

The invention claimed is:

1. A method for indicating wear of a tyre in a vehicle, said method comprising steps of:
sensing contact of at least one sensor with ground surface by the at least one sensor located at a re-threading level of the tyre, wherein data is generated by the at least one sensor upon contact with a ground surface;
receiving the data from the at least one sensor by a control module through one or more connectors, wherein a predefined condition is determined by the control module, upon receiving the data, wherein the predefined condition includes, evaluation of whether the data is received for a predetermined amount of distance with respect to a current meter usage distance, retrieved from a dashboard of the vehicle;
transmitting, by the control module, the data to the dashboard of the vehicle and a display unit on the tyre upon determining the predefined condition, wherein the data is displayed on the dashboard which is communicatively connected to the control module for indicating wear of the tyre; and
transmitting, by the dashboard, a signal relating to the displayed data to one or more indicators configured on the tyre for indicating wear of the tyre, wherein the one or more indicators are communicatively connected to the dashboard of the vehicle.

2. The method as claimed in claim 1 further comprising displaying the data on a display unit configured on the tyre, wherein the data is received from the control module by the display unit.

3. The method as claimed in claim 1, wherein the at least one sensor is selected from at least one of a touch sensor filament, pressure sensors, temperature sensors, gyro sensors, force sensors, resistive sensors and capacitive touch sensors.

4. The method as claimed in claim 3, wherein the data from at least one sensor comprises pressure, temperature and thread orientation of the tyre received from the pressure sensors, the temperature sensors and the gyro sensors respectively and is displayed on the dashboard and display unit of the tyre.

5. The method as claimed in claim 1, wherein the data received from the at least one sensor is stored in a storage unit of the control module.

6. The method as claimed in claim 1 comprises triggering a light source of the one or more indicators by a triggering unit in the one or more indicators upon receiving signal from the control module, wherein the light source transmits the light in an optical fibre.

7. The method as claimed in claim 6, wherein the at least one sensor is made of a radium coated material.

* * * * *